United States Patent [19]

Coron

[11] Patent Number: 5,106,205

[45] Date of Patent: Apr. 21, 1992

[54] SEALING DEVICE FOR A LINEAR GUIDING MODULE FOR THE TRANSFER AND HANDLING OF ALL PARTS AND ACCESSORIES

[76] Inventor: Jean-Paul Coron, Chassenas, 69440 Saint Maurice Sur Dargoire, France

[21] Appl. No.: 673,284

[22] Filed: Mar. 21, 1991

[30] Foreign Application Priority Data

Mar. 22, 1990 [FR] France ............................ 90 03984

[51] Int. Cl.$^5$ ............................................. F16C 29/08
[52] U.S. Cl. .................................................... 384/15
[58] Field of Search ...................... 384/15, 45, 42, 16, 384/37

[56] References Cited

U.S. PATENT DOCUMENTS 2,693,396 11/1954 Gondek ............................... 384/15
4,850,720 7/1989 Osawa ................................. 384/15
4,921,358 5/1990 Kasuga et al. ....................... 384/15
4,961,480 10/1990 Weiler et al. ........................ 384/16

Primary Examiner—Lenard A. Footland
Attorney, Agent, or Firm—Wall and Roehrig

[57] ABSTRACT

The device is remarkable in that the bottom part of the saddle is designed to cooperate with a means enabling to move in a controlled and limited manner, the to part of the said saddle being designed with a profiled opening over its length to enable the protective and sealing strip to pass, be guided and orientated, the said strip being fixed at the ends to the end parts of the body of the module thereby developing in a horizontal plane and wherein the inside of the saddle has means arranged in the profiled opening to enable the strip to be twisted and shaped in a vertical or slanted position over the majority of the length of the saddle.

11 Claims, 3 Drawing Sheets

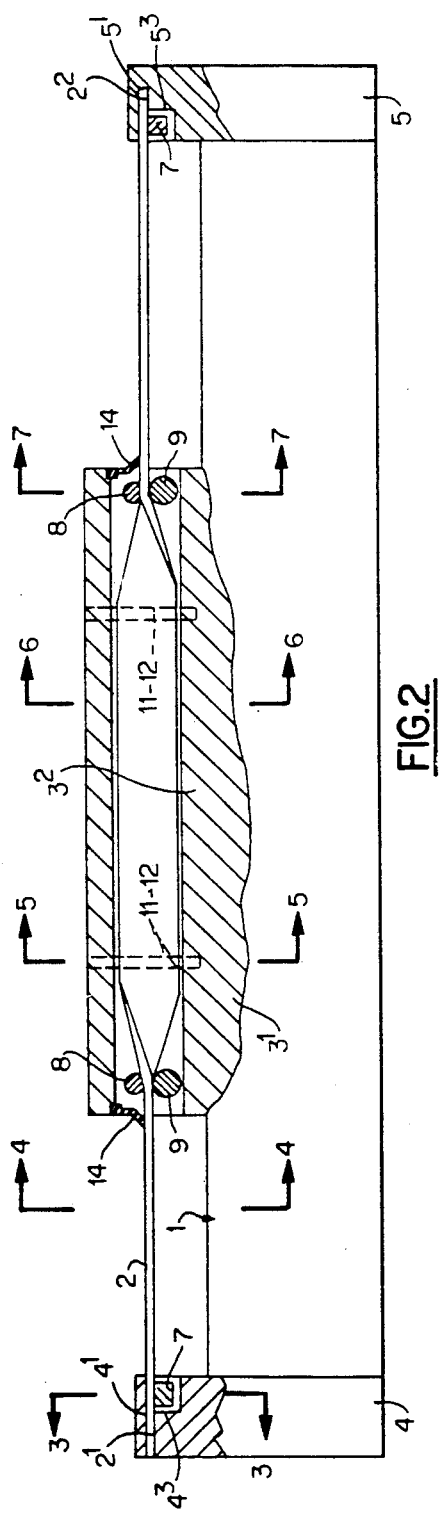
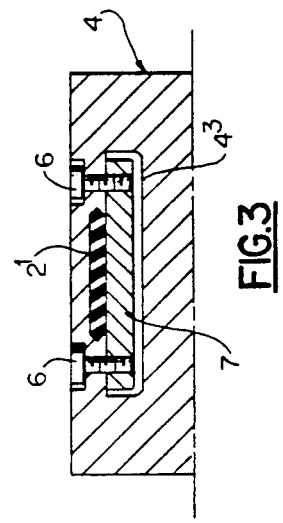
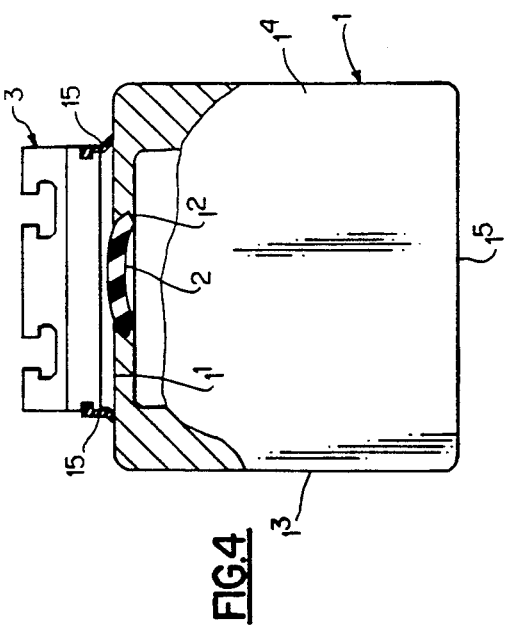
FIG.2
FIG.3
FIG.4

SEALING DEVICE FOR A LINEAR GUIDING MODULE FOR THE TRANSFER AND HANDLING OF ALL PARTS AND ACCESSORIES

The object of the invention is a sealing device for a linear guiding module for the transfer and handling of all parts and accessories.

The invention relates to the technical sector of in line handling and transfer means for parts, particularly applicable to automation systems and particularly for machines, machine-tools, numerical control machining centres, industrial robots and all automatic feeding systems, measuring instruments, manipulators.

The design of linear modules for transfer and handling, has been known for many years and is widely marketed, particularly in the above-mentioned technical sectors. In general, this relates to components ready to be mounted which are fixed on to a supporting surface by the bottom part and provided with a profiled structure enabling reciprocating movement according to a determined cycle of a slide on which one or more parts or tools or others are fixed, likely to operate and take action according to a pre-determined cycle in a continuous reciprocating movement.

The inside of the above mentioned structure of the module has a space for guiding and moving the transfer slide. Ball screw, roller and others or toothed belt or cylinder guide and drive systems are used.

To protect the linear module and its internal mechanisms in particular, protective strips are used, in the case of a slide mounted on ball screws, or drive belts of the slide which protect mechanisms inside the structure. The drive belts are, for example, mounted between two drums or idlers or suchlike, located close to the ends inside the linear module. The belts are associated, in a fixed manner, to the transfer slide by all suitable connection means. The latter are generally provided with a horizontal slot made throughout the length to allow for the belts to pass. For example, this is the case of the linear module described in the German patent 3.815.595. As an alternative version, strips or belts can follow a specific profile whilst remaining in the same horizontal plane, if required.

In practice and even if the dimensions of the belts or strips are perfectly determined, there is always a gap which gives rise to a loss of sealing with respect to the carrying structure, such that this may hinder the use of the module and damage the mechanisms by infiltration of unsuitable substances.

Within the framework of the belts, it is to be noted that these are apparent moving parts which may jeopardize the safety of users and a source of wear themselves and to their environment.

There are also bellow type systems which are cumbersome and limit the working stroke, representing a loss of 20 to 30% according to the products currently existing on the market. Furthermore, when the modules are applied to these machines, causing, during operation, splashes of debris, chips and suchlike, the latter build up between the successive folds of the bellows, giving rise to rapid degradation of the bellows and a gradual reduction of the stroke.

In an attempt to overcome these problems, the German patent 3.815.595 offers a complex solution where the strip or belt is integrated under the top plate of the slide, whilst being associated to it, the ends of the strip or belt being inserted or guided into very specific, built up sealing profiles, fixed by clipping on to the carrying structure. The top plate of the slide therefore fully covers the top part of the structure. Such an arrangement is complex and impractical when maintenance and assembly are concerned. it is also noted that the opening of the carrying structure corresponds to its maximum internal width in order to allow for the above-mentioned mounting, thereby reducing the inertia of the body of the module.

The aim sought after according to the invention, was to design a new, perfected linear module, meeting, in a very specific and advantageous manner, the aforementioned sealing problems in particular.

Another aim of the invention was to limit the width of the top slot of the carrying structure so as to increase the inertia of the body of the modules.

These aims and others will be made well apparent from the following description.

According to a first characteristic, the sealing device of the linear guiding model is of the type comprising a long profiled body, the inside of which takes guide means, providing controlled movement of a profiled saddle, the top part of which projects outside of the aforementioned body thereby being likely to take parts or accessories, wherein the protective strip is arranged on the top surface of the body to provide, in connection with the movement of the saddle, a protective device for the mechanisms arranged inside the body, the sealing device of the module being remarkable in that the bottom part of the saddle is designed to cooperate with means enabling it to be moved in a controlled and limited manner, the top part of the said saddle being equipped with a profiled opening throughout the length to enable the protective and sealing strip to pass, be guided and orientated, the said strip being fixed at the ends to the end parts of the body of the module thereby developing in a horizontal plane and wherein the inside of the saddle has means arranged in the profiled opening to enable the strip to be twisted and positioned vertically or slanting on the majority of the length of the saddle.

According to another characteristic, the top part of the saddle has a profiled opening for the strip to pass with different internal sections to enable the protective strip to pass and be shaped from a horizontal plane to a vertical or slanted plane.

According to another characteristic, the ends of the protective and sealing strip, are inserted and held in profiles formed on the outside edges of the body, defining a slot for the saddle to pass.

These characteristics and others will be made well apparent from the following description.

In order to clarify the object of the invention, it is illustrated in a non-limitative manner with the figures of the drawings where:

FIG. 2 is a longitudinal section according to line 1—1 of FIG. 1, showing the sealing device regardless of the means enabling the longitudinal movement of the saddle.

FIGS. 3, 4, 5, 6 and 7 are cross sections according to lines 3—3, 4—4, 5—5, 6—6, 7—7 of FIG. 2 for the part corresponding to the implementation of the sealing device.

Figure 1:
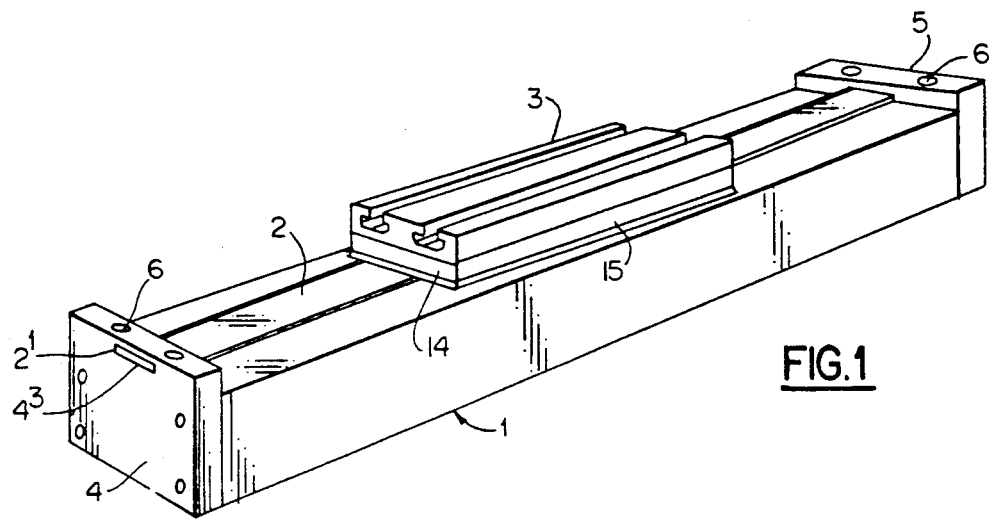
FIG. 1 is a perspective view of the linear guiding module according to the invention, with the sealing device.

In order to clarify the object of the invention, it is now described in a non-limitative manner when considered in conjunction with the embodiments of the drawings.

The linear guiding module comprises a body or parallelepipedic carrying structure (1) made out of any material. The top face (1—1) of this hollow body has a horizontal slot or opening enabling positioning of a sealing and protective strip (2) and passage of the top part of the table or saddle (3), likely to take parts or accessories.

The saddle is mounted, capable of limited and controlled movement inside the body. The different means used are not described or illustrated in this Application. The movement can be carried out by screws, cylinders, belts or others, the body, therefore being adapted to the drive means.

As shown in FIG. 4, the top edges (1.2) defining the slot for the protective strip to pass and be positioned, are made with a Vee or curved profile to ensure the said protective strip is maintained and held.

The side plates are designed and profiled to close and block the ends of the body (1) and are fixed to the latter by connecting screws.

The linear module enables controlled longitudinal movement of a saddle (3) which is likely to be moved along the body in a reciprocating movement according to a pre-determined cycle. In order to provide this movement, the saddle which will be described in more detail, is made in the form of a solid assembly, of any material, for example, aluminum. This saddle has two distinct parts, i.e., a base (3-1), profiled so as to cooperate with nonillustrated moving means and, furthermore, the top part (3-2), as the extension of the previous, is provided with a very specific internal profile which enables the successive passage, guiding and orientation of the sealing and protective strip (2), in different planes : horizontal, vertical or slanted, then horizontal.

Figure 8:
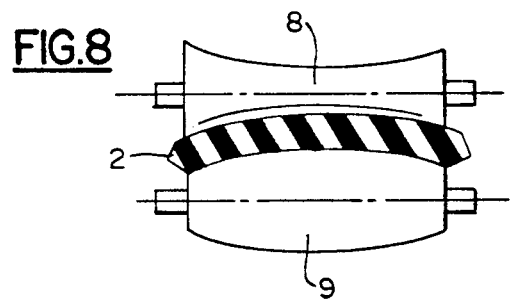
FIG. 8 is a schematic, partial view illustrating the design of the protective and sealing strip before shaping inside the slide.
Figure 9:
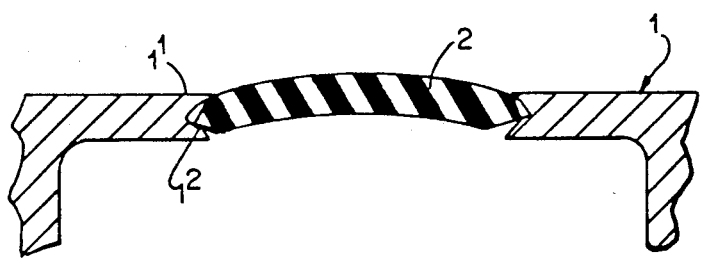
FIG. 9 is a schematic, partial view illustrating the positioning of the protective and sealing strip outside the slide.

The object according to the invention is to provide the whole length of the body of the module with total sealing. For this purpose, according to the invention, a protective and sealing strip (2) is used and may have a flat profile or preferably, crowned, as shown in FIGS. 8 and 9. This strip is inserted and held by the specific profile (1-2) of the top edges of the body of the module. The strip is inserted and guided into the saddle with a modification of its position and orientation in a different plane as shown on FIG. 2. It is to be highlighted that the position of the protective and sealing strip can only be modified by a very specific design of the internal profile of the top part of the saddle and is only carried out inside the volume of the latter.

More specifically, the width of the slot (1-1) formed in the top part of the body, is limited so that the saddle, (3) is designed with a bottom base situated inside the body of the module being extended by a narrow section (3-3) then breaking through the outside of the body in order to make up a supporting table for parts and accessories. Therefore, on either side of the middle plane of the saddle, there are two slots or notches (3-4), coming into engagement around the profile of the top edges (1-2) of the body. The intermediate part of the saddle is therefore provided with a thinner area in which profiled opening is provided in order for the protective and sealing strip to pass, be guided and maintained.

The protective strip has a slight elastic property in order for it to be tensioned and therefore increase its stiffness. Tensioning is carried out by fixing the strip at one end and pulling from the other fixing end.

The protective strip (2) is firstly, fixed by the ends (2-1) (2-2) to the aforementioned front and rear side plates (4-5). the top part of the side plates are in fact, provided with horizontal slots (4-1) (5-1)provided for the ends of the strip to be inserted and fixed. Connecting and fixing means (6) are built up and associated to a cross bar (7) arranged in a housing (4-3) (5-3) designed in each side plate to enable the strip to be assembled and fastened to the body of the module. It is to be noted that the slots (4-1) (5-1) made in the side plates, are located in the same plane and extension as the top profiled edges (1-2) of the body of the module. Therefore, the strip, which is fixed by the ends, to the side plates, fully covers the top opening made in the body of the module, thereby being arranged throughout the length of the body in the horizontal position when it is not inserted in the saddle.

In an advantageous manner, the ends of the strip may have a toothed part to facilitate fixing with the fastening means. According to the invention, throughout the length of the top part of the saddle, there is a profiled opening, the shape and section of which vary and are symmetrical with respect to the transversal middle plane of the saddle in order for the protective strip to be inserted into the saddle, according to a horizontal plane, then twisted so as for the strip to be in a vertical or slanted plane on the majority of the length of the saddle, then twisted in the opposite way again, so that the strip is at the outlet of the saddle, in a horizontal plane.

Figure 6:
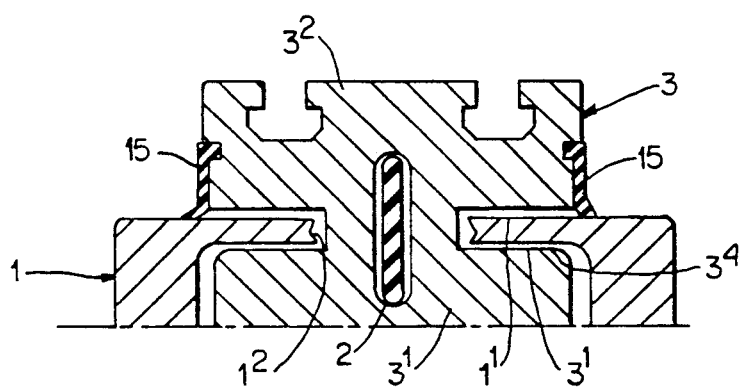
Figure 5:
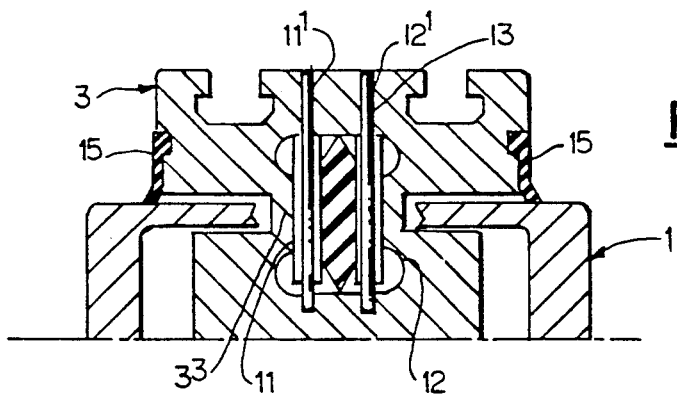
Figure 7:
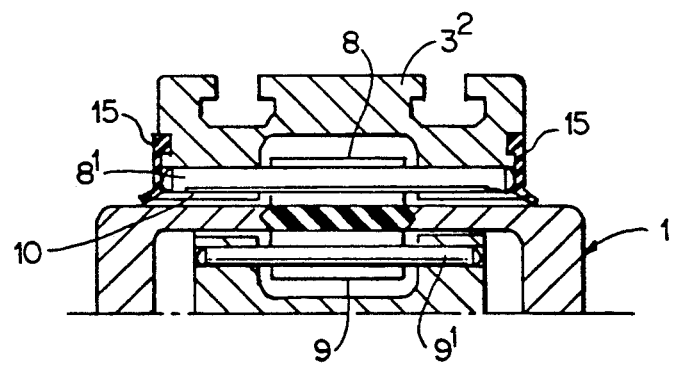

In order to provide this specific shaping, the saddle has an internal opening, the profile of which is successively illustrated in FIGS. 7, 5 and 6. These profiles are made during the manufacture of the saddle by any known technical means.

At the inlet or outlet of the saddle, corresponding to FIG. 7, the protective and sealing strip (2) is horizontal and guided inside the saddle by horizontal rolls (8) (9), the rotary shafts (8-1) (9-1) of which are inserted in housing (10) provided for this purpose.

At the inlet and outlet of the saddle, the protective strip is suitably held and guided by the Vee or curved profile of the top edges (1-2) of the body of the module.

At the outlet of the rolls (8) (9), located in the front part of the saddle and at the inlet of the rolls (8) (9), situated in the rear part of the saddle, the protective strip is twisted in the opposite direction, as shown in the drawings, so as to be in a vertical or slanted position. Rolls (11) (12), arranged vertically inside the profiled opening of the saddle, hold and guide the strip. For this purpose, the rotation shafts (11-1) and (12-1) of the rolls, are positioned in housings (13), designed for this purpose, in the saddle. The external profile of the rolls (8) (9) (11) (12) may be flat or crowned to apply a stress and be closely adapted to the profile of the protective strip and guide it. The opening for the passage of the protective strip is therefore profiled so as to be adapted to the passage and development of the protective strip. Thanks to this arrangement, the protective and sealing strip is in a vertical position on the majority of the length of the saddle, with the exception of the ends. The profiled opening is therefore reduced to a minimum and has an oblong form which is either vertical or slanted in order to keep the maximum of material in the intermediate area of the saddle, thereby ensuring it greater stiffness in order to take the loads and stresses of the linear module into account. Furthermore, as shown in the drawings, complementary seals (14) and (15) are arranged firstly, longitudinally between the top part projecting from the saddle and the top body of the module, and secondly, transversally, between the top part of the saddle and the protective strip itself. The seals (14) (15) are fixed by any suitable means by clipping for example or others, in housings provided for this purpose on the top part of the saddle.

As an alternative model, a butted strip fixed by any means, particularly by using its elastic deformation property, the said strip being arranged around the periphery of the saddle so as to come into contact with the sealing strip on the top profile of the body.

The linear guiding module thus described is of simple construction and provides total sealing of the internal mechanisms.

The sealing device thus described can be adapted to linear modules with a large saddle and guided longitudinally by several transfer means.

Besides, another characteristic the sealing belt may have is to be pointed out. This may be internally provided with one or several reinforcement inserts, for example, in the form of cables, fibres, carbon fibres or other composite materials. These inserts advantageously prevent the belt from being stretched due to multiple handling operations during the operation of the linear guiding device in which it is associated.

I claim:

1. Sealing device for linear guiding module of the type comprising a long profiled body (1), the inside of which takes a guide means enabling controlled movement of a profiled saddle (3), the top part of which projects outside the aforementioned body to take parts or accessories, a protective strip (2) being arranged on the top surface of the body so as to provide, in connection with the movement of the saddle, protection for the mechanisms arranged inside the body, the bottom part of the saddle being designed to cooperate with a means providing its controlled and limited movement, the top part of the said saddle being provided with a profiled opening over its length to enable the passage, guiding and orientation of the protective and sealing strip, the said sealing device of the linear guiding module being characterized in that the said strip is fixed by its ends to the end parts of the body of the module thereby developing in a horizontal plane, and wherein the inside of the saddle has means arranged in the profiled opening in order for the strip to be twisted and positioned vertically or slanting over the majority of the length of the saddle.

2. Device according to claim 1, wherein the ends of the protective and sealing strip are inserted and held in profiles formed on the outside edges of the body, defining a slot for the saddle to pass.

3. Device according to claim 1, wherein the top part of the saddle has a profiled opening for the strip to pass, with different internal sections for the protective strip to be passed and shaped from a horizontal plane to a vertical or slanting plane.

4. Device according to claim 3, wherein means in the form of rolls are arranged in the different sections of the profiled opening, rolls (8) (9) being arranged horizontally with rotation shafts (8-1) (9-1) inserted in housings made in the saddle, the said rolls (8) (9) being located in the front and rear part of the saddle, and wherein rolls (11-12) are vertically arranged in the profiled sections of the opening inside the saddle for the protective and sealing strip to be twisted and shaped in a vertical or slanted position.

5. Device according to claim 3, wherein the rolls (8) (9) (11) (12) have an external profile corresponding to the profile of the protective and sealing strip 6. Device according to claim 1, wherein the saddle is provided with a bottom base located inside the body of the module extending by a narrow section (3-3) arranged opposite the ends of the top edges of the body of the module and extending by its top part outside the body of the module to take and have parts and accessories and wherein, in the intermediate part of the saddle, the profiled opening for the protective and sealing strip to pass, is arranged and wherein the bottom base of the saddle is designed so as to cooperate with a means providing its longitudinal movement in the body of the module.

7. Device according to claim 1, wherein complementary sealing means (14) (15) are arranged, firstly, longitudinally between the top projecting part of the saddle and top body of the module, and, secondly, transversally between the top part of the saddle and protective strip.

8. Device according to claim 7 wherein the seals (14-15) are made up of a butted strip with an elastic deformation property, the said strip being fixed by any means onto the periphery of the saddle so as to come into contact on the sealing strip and top profile of the body.

9. Device according to claim 1, wherein the end parts of the body include side plats (4) and (5), the top part of which is designed to take and hold the ends of the protective strip, in plane extending from the holding position of the strip between the top edges of the body.

10. Device according to claim 9 wherein the strip has an elastic fixing property.

11. Device according to claim 1, wherein the inside of the protective strip is provided with one or more reinforcement inserts, these inserts capable of being cables, fibres, composite materials or others.

* * * * *